(12) United States Patent
Matthews

(10) Patent No.: US 9,445,045 B2
(45) Date of Patent: Sep. 13, 2016

(54) VIDEO CONFERENCING DEVICE FOR A COMMUNICATIONS DEVICE AND METHOD OF MANUFACTURING AND USING THE SAME

(75) Inventor: Kim Matthews, Watchung, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 2103 days.

(21) Appl. No.: 12/144,114

(22) Filed: Jun. 23, 2008

(65) Prior Publication Data

US 2009/0315974 A1  Dec. 24, 2009

(51) Int. Cl.
*H04N 7/14* (2006.01)

(52) U.S. Cl.
CPC ..................................... *H04N 7/144* (2013.01)

(58) Field of Classification Search
USPC .......... 379/112.01; 348/14.08, E07.083, 345, 348/14.1; 345/619; 382/154
See application file for complete search history.

(56) References Cited

U.S. PATENT DOCUMENTS

| | | | |
|---|---|---|---|
| 6,693,672 B1 * | 2/2004 | Oliver | 348/345 |
| 7,643,671 B2 * | 1/2010 | Dong et al. | 382/154 |
| 2007/0200925 A1 * | 8/2007 | Kim | 348/14.08 |

* cited by examiner

*Primary Examiner* — Md S Elahee
(74) *Attorney, Agent, or Firm* — Parker Justiss, PC

(57) ABSTRACT

A video conferencing device for improving video quality when a communications device is used for a video conference. In one embodiment the device includes (1) a data collection module for collecting data regarding the location and orientation of a user's face relative to a camera on a communications device; and (2) a facial correction module associated with the data collection module, the facial correction module modifying a user's facial orientation and characteristics for transmission during a video conference based on data from the data collection module and from an associated database of relevant facial characteristics.

21 Claims, 2 Drawing Sheets

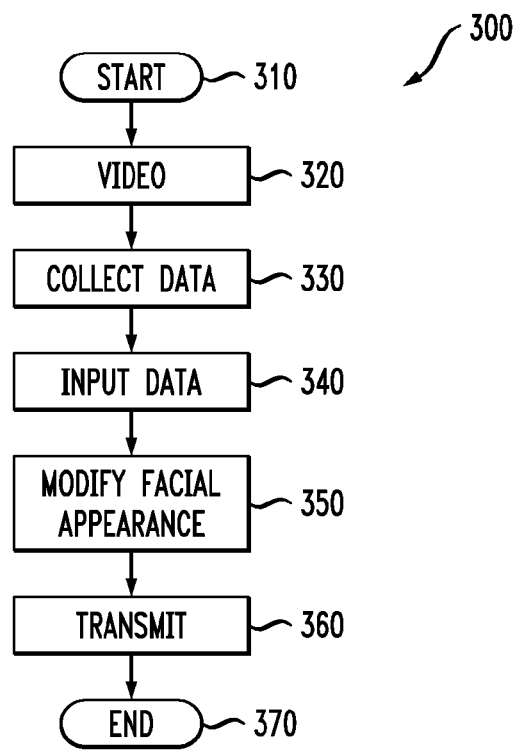
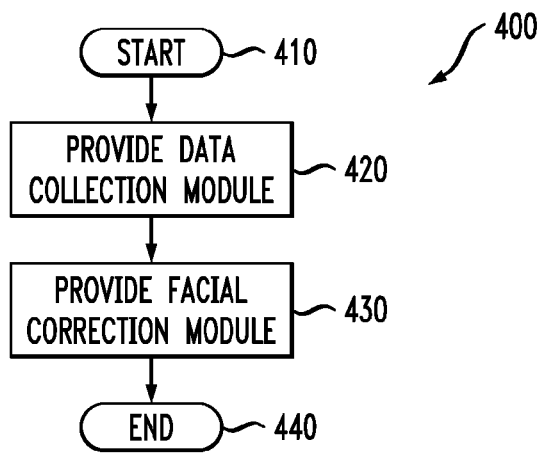

US 9,445,045 B2

VIDEO CONFERENCING DEVICE FOR A COMMUNICATIONS DEVICE AND METHOD OF MANUFACTURING AND USING THE SAME

TECHNICAL FIELD OF THE INVENTION

The invention is directed, in general, to a video conferencing device and, more specifically, to a device for improving video quality when a communications device is used for video conferencing.

BACKGROUND

This section introduces aspects that may help facilitate a better understanding of the inventions. Accordingly, the statements of this section are to be read in this light and are not to be understood as admissions about what is prior art or what is not prior art.

A variety of video devices can be used for a video conference between geographically separated parties. Video conferencing capability constitutes an important resource for parties wanting to conduct "face to face" meetings but also wanting to save travel time and avoid the inconvenience necessitated by travel. Not only may the level of communication be enhanced when the parties can see each other, but video conferencing also permits communicative methods to be used other than vocal communications. For example, the parties can observe diagrams or use a white board to create an outline that can be observed by all participants.

Prior art video conference technology has advanced from the necessity of having special rooms set up with cameras and speakers for such a conference to the utilization of available computer associated cameras. Several technologies are known that provide video conferencing capability with the primary prerequisites being an available camera to capture the appearance of each party to the conference and a means to communicate orally. As long as each party to the conference can see and hear the other party or parties, a video conference can be conducted. Current technology even permits users of handheld mobile communications devices, such as a mobile phone, to participate in video conferences.

SUMMARY OF THE INVENTION

To address deficiencies of the prior art, various embodiments provide for a video conferencing device to improve the video quality of a user when using a communications device, particularly a mobile communications or other handheld device, for video conferencing.

In one embodiment, the device includes (1) a data collection module for collecting data regarding the location and orientation of a user's face relative to a camera on a communications device and (2) a facial correction module associated with the data collection module. The facial correction module is capable of modifying a user's facial orientation and characteristics for transmission during a video conference based on data from the data collection module and from an associated database of relevant facial characteristics.

The present invention also includes various embodiments of methods to manufacture and use similar devices.

BRIEF DESCRIPTION OF THE DRAWINGS

For a more complete understanding of the invention, reference is now made to the following descriptions taken in conjunction with the accompanying drawings, in which:

FIG. 3 illustrates a block diagram explaining the operation of one embodiment of the present invention, as illustrated in FIG. 2; and FIG. 4 illustrates a block diagram of a method of manufacturing a video conferencing device constructed in accordance with the present invention.

DETAILED DESCRIPTION OF ILLUSTRATIVE EMBODIMENTS

Quality problems are inherent when a handheld device, such as a mobile phone, is used in a video conference. These quality problems chiefly include head motion by the speaker as well as the orientation and distance of the speaker from the camera lens. Gaze misalignment of the speaker can also be a problem. The quality of a video conference utilizing current technology when a handheld device is used to provide video for a video conference can be characterized as being fair at best. A more accurate description would be to describe the video quality is being poor or marginal. There are a number of reasons for this. For example, the user of a handheld or mobile communications device frequently will be moving about or walking while he or she is participating in the video conference. This usually means the user is not looking into the camera lens and the device is bouncing around during the conference. In addition, the user's face will be generally be distorted because the handheld device is held at an angle from the face. In addition, because the user is not looking into the camera lens, the user's gaze will appear misaligned and there will be no "eye-to-eye" contact with other participants. These factors cause a general deterioration of the quality of the call experience whenever a handheld device is used to provide the video component. Although some of these same factors will be present when a communications device other than a handheld device is used, they are accentuated when a handheld device is used.

Accordingly, what is needed in the art is a device to improve the facial appearance of a party when a communications device is used to provide video during a video conference.

Figure 1:
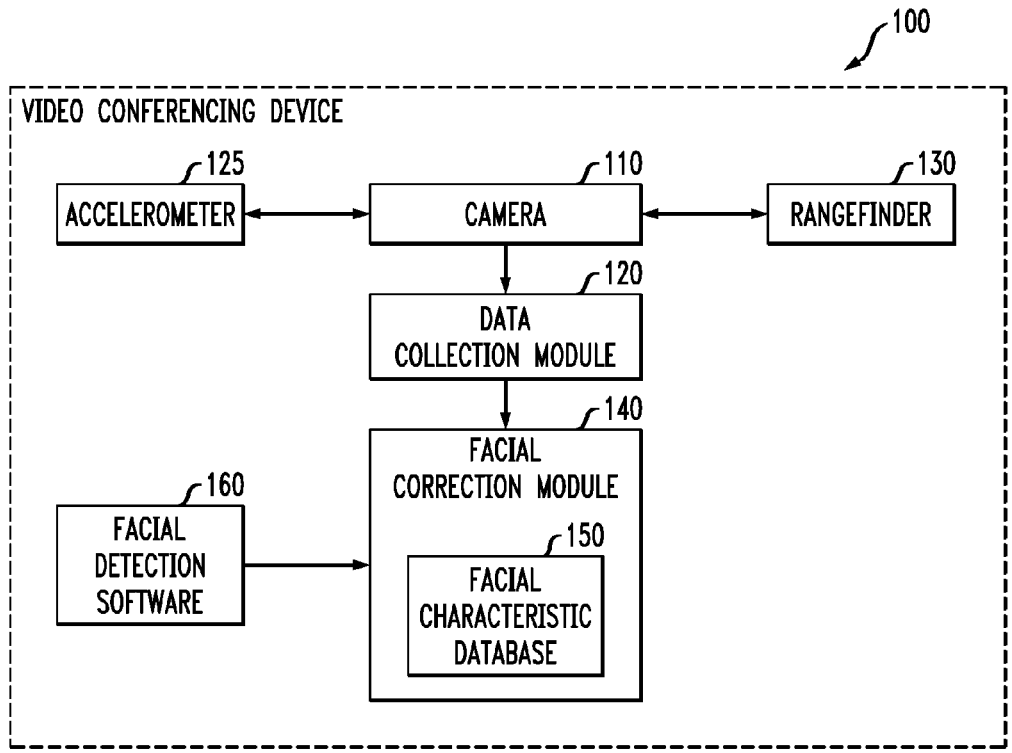
FIG. 1 illustrates a block diagram of a video conferencing device constructed in accordance with the present invention for use with a communications device during a video conference.

Turning initially to FIG. 1, illustrated is a block diagram of a video conferencing device 100 constructed in accordance with one embodiment for use with a communications device during a video conference. The illustrated video conference device 100 improves the video quality of the image of a user's face when it is transmitted to other participants.

As will be readily understood by those skilled in the pertinent art, any type of communications device with a video conferencing device 100 constructed in accordance with the various embodiments will be within the intended scope of the present invention. It is particularly useful when the communications device is a mobile communications or handheld device, such as a mobile phone, that includes, as one of its features, a camera 110 that captures an image of a person and transmits it to those participating in the video conference.

A person using a mobile communications device in a video conference will often be in a situation where he or she is not gazing directly into the camera 110 lens and will often be positioned so the camera 110 does not capture a good view of his or her face. For example, the user may be walking during a video conference while holding a mobile phone at waist height. Another example would be where a user is participating in a video conference while working on a desk top computer with the mobile communications device sitting on a desk or table. In such situations, the camera 110 captures a distorted facial view of the user because of the angle of the camera 110 lens from the face. Because the user will not be looking directly in the lens, there will be no apparent "eye contact" with other participants. As will be readily apparent to those skilled in the pertinent art, the present invention can also be usefully employed when a user is participating in a video conference by way of a desktop computer or other conferencing device, such as a conference room video conferencing arrangement. In any such situation, a user may be moving with respect to he camera 110 and he or she may not be maintain eye contact with the camera 110 lens. As hereinafter described, the present invention will improve the transmitted facial image quality of a user.

In order to enhance or improve a user's facial image, data regarding such image, as recorded by the camera 110, is collected by a data collection module 120. The data collection module 120 collects and stores data regarding the location and orientation of the user's face relative to the camera 110. To improve the quality of the data collected by the data collection module 120, one embodiment of the invention provides for the video conferencing device 100 to have an accelerometer 125 associated with the camera 110 to measure the camera's 110 orientation and movement relative to the user's face. In still another embodiment of the invention, the accelerometer 125 detects acceleration in three dimensions.

Another embodiment of a video conferencing device 100 constructed in accordance with the present invention provides for a range finder 130 to measure the distance from the camera 110, or camera 110 lens, to the user's face. In yet still another embodiment of the invention, the range finder 130 is an ultrasonic range finder 130.

The video conferencing device 100 also includes a facial correction module 140 which is associated with the data collection module 120. The facial correction module 140 modifies the user's facial orientation and/or characteristics for transmission during a video conference based on data received from the data collection module 120, as well as data from an associated database of relevant facial characteristics 150. One embodiment provides for facial detection software 160 to be associated with the facial correction module 140. In this embodiment, the associated database of relevant facial characteristics 150 may include data stored in or generated by such facial detection software 160.

Figure 2:
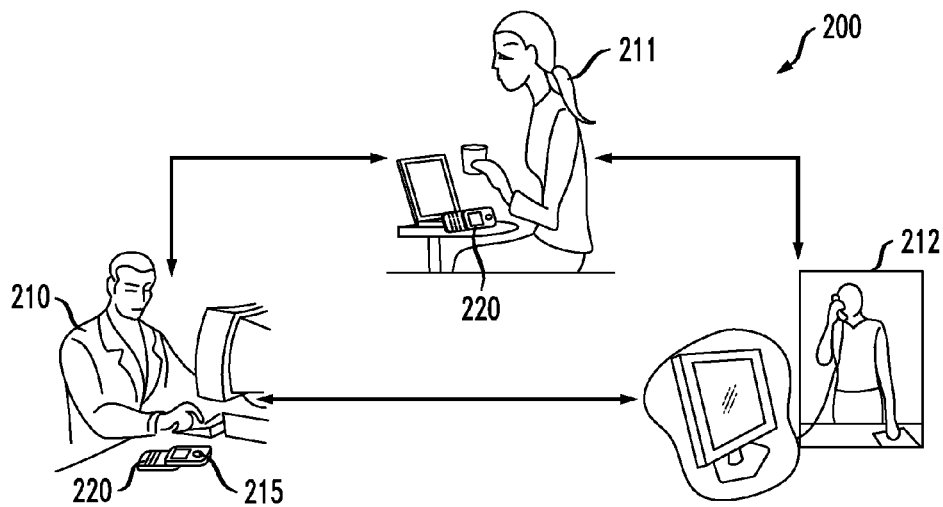
FIG. 2 illustrates a schematic representation of a participant in a video conference using a mobile phone equipped with a video conferencing device that is constructed in accordance with the present invention.

Turning now to FIG. 2, illustrated is a schematic representation of three participants 210-212 in a video conference 200 where two of participants 210, 211 are using mobile phones 220 to participate in the conference 200 with each such phone 220 is equipped with a video conferencing device 100 constructed in accordance with various embodiments. Each mobile phone 220 has a camera 215 and is held at an angle to the respective participants' 210, 211 face, such that his or her face will be distorted. Two of the participants 210, 211 are not looking directly into the camera 215 lens so they will not have any apparent eye contact with the other participants.

In the absence of improvements of various embodiments, the participants 210-212 may perceive a distorted view of at least two of the participants 210, 211 and there may be no "eye contact" in transmitted images of said participants 210, 211. The video conferencing device 100, when constructed in accordance with various embodiments, can advantageously be used to normalize the apparent view of the two participants 210, 211 using mobile phones 220, both as to facial view and apparent eye contact.

Turning now to FIG. 3, illustrated is a block diagram explaining the operation 300 of one embodiment as illustrated in FIG. 2. The operation commences with a start step 310. The image of the participant 210 in the video conference 200 is by a camera 215 on the mobile phone 220 in a video step 320. During the video step 320, a data collection module 120 collects data regarding the location and orientation of the participant's 210 face relative to the camera 315 in a collect data step 330. The data collected by the data collection module 120 not only includes data captured during the current video conference 200, it may also include data collected at any time the camera 215 has been used to capture the particular participant's 210 image, such as earlier in the conversation or during a previous video conference. Thus, participants 210-213 who regularly use a mobile communications device or other video conferencing device may have provided extensive data that has been collected and can be used to modify or change the relative location and appearance of the participant's face for a particular video conference.

In certain embodiments, an accelerometer associated with the camera will track the camera's 220 orientation and/or movement relative to the participant's 210-212 face, which accelerometer, in some such embodiments, can detect acceleration in three dimensions. In still another embodiment, a range finder, such as an ultrasonic rangefinder, can be used to measure the distance between a participants' 210-212 face and the camera 220 lens. The net result will be a collection of location and/or orientation data regarding a particular participants' 210-212 face. Some embodiments may include both an accelerometer and a rangefinder as described above.

Data from the data collection module 120 is transferred to a facial correction module 140 in an input data step 340. The facial correction module 140 utilizes this data in addition to data from an associated database of relevant facial characteristics saved in the data collection module to modify a participant's 210-212 facial orientation in a modify facial appearance step 350. The data collection module can be used to revise and alter the reconstructed position and/or orientation of a participant's 210-212 facial image in the produced video images. For that reason, in some embodiments, the video images of one or more of the participants 210-212 show said one or more of the participants 210-21 as looking directly into the camera 215 lens and having eye contact with the camera 215 lens. The data collection module may even go so far as using the data to construct a "virtual" face of a participant 210-213 that appears to the other participants 210-212 in the video conference as a full facial view of the participant 210-212 with appropriate "eye contact", e.g., direct eye contact. Data derived from a trained face detection algorithm, such as that available from an open source computer vision library, such as that originally developed and published by Intel Corp (http://en.wikipedia.org/wiki/OpenCV), may be used as the basis for constructing or reconstructing such a facial view. Such information as a model head form and an assumed orientation based on the relevant context of a presentation may be programmed into the associated database of relevant facial characteristics. Some embodiments may also utilize information to correct head orientation by using the output of a face detection system to indicate head orientation, such as detecting eye location, searching for the best facial symmetry or finding the best match to a frontal facial dataset as the facial data is rotated/scaled/etc. In some embodiments, the associated database of relevant facial characteristics may include machine-executable facial detection and/or recognition software that is able to produce data on the facial characteristics, e.g., forms, positions, and/or orientations of the face of one or more of persons being shown in the video conference. In such cases, the associated database of relevant facial characteristics may include the data generated by such machine-executable facial detection and/or recognition software. During the video conference, modified facial appearances of the participant may then be transmitted to other video conference participants 210-212 in video frames transmitted in a transmit step 360. The operation closes with an end step 370.

Turning now to FIG. 4, illustrated is a block diagram of a method of manufacturing 400 a mobile communications video conferencing device constructed in accordance with the present invention. The method commences with a start step 410. In a provide data collection module step 420, a communications device is provided with a module, most probably software embodied in hardware, to be operated by the communications device for the collection of data regarding the location and/or orientation of a user's face relative to a camera on a communications device. The provide data collection module step 420 may include the provision of an accelerometer to be associated with the communication's device camera for measuring the orientation and movements of the camera relative to the user's face, which accelerometer may detect acceleration in three dimensions. The provide data collection module step 420 may also include the provision of a range finder for measuring the distance from a lens on the camera to the user's face, which range finder may be, e.g., an ultrasonic device.

In a provide facial correction module step 430 a facial correction module is associated with the data collection module. The facial correction module is capable of modifying the user's facial orientation and facial characteristics for transmission during a video conference based on data from the data collection module as well as data from an associated database of relevant facial characteristics. The database of relevant facial characteristics may include data collected by facial detection software associated with the facial correction module. The method concludes with an end step 440.

Several embodiments of methods of using the device described herein are also provided. Referring again to FIG. 3, a method of using a video conferencing device can be described. The method commences with a start step 310. In a video step 320, a user is photographed with a camera to produce a sequence of video images that include the user's face. This information is then used, in a collect data step 330, to record data regarding the location and orientation of the user's face relative to a camera. The data is input, in an input data step 340, and used to modify the orientation of the user's face, in a modify facial appearance step 350, to produce modified video images of the user's face. These modified images are then transmitted in a transmit step 360. The method concludes with an end step 370.

In one embodiment, relative acceleration between the camera and a user's face is measured. This embodiment may also detect acceleration in orthogonal directions. Another embodiment includes measuring the distance between a user's face and the camera. One embodiment that can be used to measure such distance includes the sending of ultrasonic waves to the user and receiving user reflected ultrasonic waves in reply. Of course, both embodiments described in this paragraph can be combined into a single device and be within the intended scope of the invention.

Those skilled in the art to which the invention relates will appreciate that other and further additions, deletions, substitutions and modifications may be made to the described embodiments without departing from the scope of the invention.

What is claimed is:

1. A video conferencing device for use with a communications device, comprising:
 a data collection module for collecting data regarding an orientation of a face of a participant in a video conference relative to a camera, said camera being configured to capture images of said face for transmission by said communications device during said video conference; and
 a facial correction module associated with said data collection module, said facial correction module being configured to modify said captured images by modifying an orientation of said face therein such that said communications device transmits said modified images during said video conference, the facial correction module being configured to perform said modifying based on the collected data.

2. The video conferencing device as recited in claim 1 further including an accelerometer configured to measure movement of said face relative to said camera.

3. The video conferencing device as recited in claim 2 wherein said accelerometer is able to detect accelerations of said face in three orthogonal directions.

4. The video conferencing device as recited in claim 1 further including a range finder configured to measure a distance from said camera to said face.

5. The video conferencing device as recited in claim 4 wherein said range finder includes an ultrasonic range finder.

6. The video conferencing device as recited in claim 1 wherein said facial correction module is configured to modify said images by executing non-transitory machine-executable facial detection software encoded in a digital data-storage medium.

7. The video conferencing device as recited in claim 1 wherein said communications device is selected from a group consisting of:
 a mobile phone;
 a desktop computing device;
 a conference room video conferencing device; and
 a handheld computing device.

8. The video conferencing device as recited in claim 1 further including a camera.

9. A method of manufacturing a video conferencing device for a communications device, comprising:
 providing a camera capturing a stream of video pictures of a participant in a video conference;
 providing a data collection module configured to collect data on the location and orientation of a face of said participant relative to said camera; and
 providing a facial correction module associated with said data collection module, said facial correction module configured to modify said captured images by modifying an orientation of said face in said captured images, the facial correction module being configured to perform said modifying based on collected data from said data collection module.

10. The method as recited in claim 9 further including providing an accelerometer configured to measure an orientation and/or movement of said camera relative to said face.

11. The method as recited in claim 10 wherein said accelerometer is configured to detect accelerations in three orthogonal directions.

12. The method as recited in claim 9 further including providing a range finder configured to measure the distance of said face from said camera.

13. The method as recited in claim 12 wherein said range finder is an ultrasonic range finder.

14. The method as recited in claim 9, wherein said facial correction module further includes machine-executable facial detection software.

15. The method as recited in claim 9 wherein said communications device is selected from a group consisting of:
a mobile phone;
a desktop computing device;
a conference room video conferencing device; and
a handheld computing device.

16. A method of using a video conferencing device, comprising:
photographing a user with a camera to produce a sequence of captured video images for transmission by said video conferencing device during a video conference, the images including a face of said user;
collecting data with a data collection module regarding the location and orientation of said face relative to said camera;
modifying said captured images to adjust the orientation of said face in said captured images with a facial correction module, said facial correction module being configured to perform said modifying based on collected data from said data collection module; and
transmitting said modified images during the video conference.

17. The method as recited in claim 16 further including measuring a relative acceleration between said camera and said face.

18. The method as recited in claim 17 wherein said measuring said relative acceleration includes detecting accelerations in three different spatial directions.

19. The method as recited in claim 16 further including measuring a distance between said face and said camera.

20. The method as recited in claim 19 wherein said measuring a distance includes sending ultrasonic waves to said face and receiving ultrasonic waves reflected by said face.

21. The method as recited in claim 16 wherein said communications device is selected from a group consisting of:
a mobile phone;
a desktop computing device;
a conference room video conferencing device; and
a handheld computing device.

* * * * *